United States Patent
Martinez et al.

(10) Patent No.: US 10,013,565 B2
(45) Date of Patent: Jul. 3, 2018

(54) SYSTEM AND METHOD FOR SECURE TRANSPORT OF DATA FROM AN OPERATING SYSTEM TO A PRE-OPERATING SYSTEM ENVIRONMENT

(71) Applicant: Dell Products, LP, Round Rock, TX (US)

(72) Inventors: Ricardo L. Martinez, Leander, TX (US); Anand P. Joshi, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 120 days.

(21) Appl. No.: 14/462,199

(22) Filed: Aug. 18, 2014

(65) Prior Publication Data

US 2016/0048694 A1    Feb. 18, 2016

(51) Int. Cl.
*G06F 21/00* (2013.01)
*G06F 21/60* (2013.01)
*G06F 21/62* (2013.01)
*G06F 21/57* (2013.01)

(52) U.S. Cl.
CPC .......... *G06F 21/606* (2013.01); *G06F 21/575* (2013.01); *G06F 21/6218* (2013.01); *G06F 2221/034* (2013.01)

(58) Field of Classification Search
CPC .......... G06F 21/50; G06F 21/54; G06F 21/71; G06F 21/606; G06F 21/6218; G06F 21/575; G06F 2221/034; G06F 21/57; G06F 21/572; G06F 2221/03
USPC ....................................................... 713/193
See application file for complete search history.

(56) References Cited

U.S. PATENT DOCUMENTS

| | | | |
|---|---|---|---|
| 8,458,791 B2 | 6/2013 | Do et al. | |
| 2005/0166051 A1* | 7/2005 | Buer | H04L 9/3263 713/173 |
| 2010/0082968 A1* | 4/2010 | Beverly | G06F 12/1433 713/2 |
| 2010/0087982 A1 | 4/2010 | Allen | |
| 2011/0185165 A1* | 7/2011 | Haga | G06F 21/57 713/2 |
| 2012/0047576 A1 | 2/2012 | Do et al. | |
| 2012/0096254 A1* | 4/2012 | Bauchot | G06F 9/4403 713/2 |
| 2014/0258700 A1* | 9/2014 | England | G06F 21/572 713/2 |

* cited by examiner

*Primary Examiner* — Joseph P Hirl
*Assistant Examiner* — Chi Nguy
(74) *Attorney, Agent, or Firm* — Larson Newman, LLP (57) ABSTRACT

An information handling system includes a trusted platform module (TPM) and a storage device, the TPM provides boot authentication for the information handling system such that, during a pre-boot phase, the TPM can access a platform configuration register (PCR). During a first instance of the pre-boot phase, the information handling system provides a public/private key pair including a public key and a private key, stores the private key to an encrypted storage of the TPM, seals the private key in the encrypted storage to the PCR, and stores the public key to the storage device. During an operating system phase that is after the first instance of the pre-boot phase, the information handling system retrieves the public key from the storage device, encrypts transfer data using the public key, and stores the encrypted transfer data to the storage device.

20 Claims, 4 Drawing Sheets

SYSTEM AND METHOD FOR SECURE TRANSPORT OF DATA FROM AN OPERATING SYSTEM TO A PRE-OPERATING SYSTEM ENVIRONMENT

FIELD OF THE DISCLOSURE

This disclosure generally relates to information handling systems, and more particularly relates to the secure transport of data from an operating system to a pre-operating system environment.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An example of an information handling system includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 1:
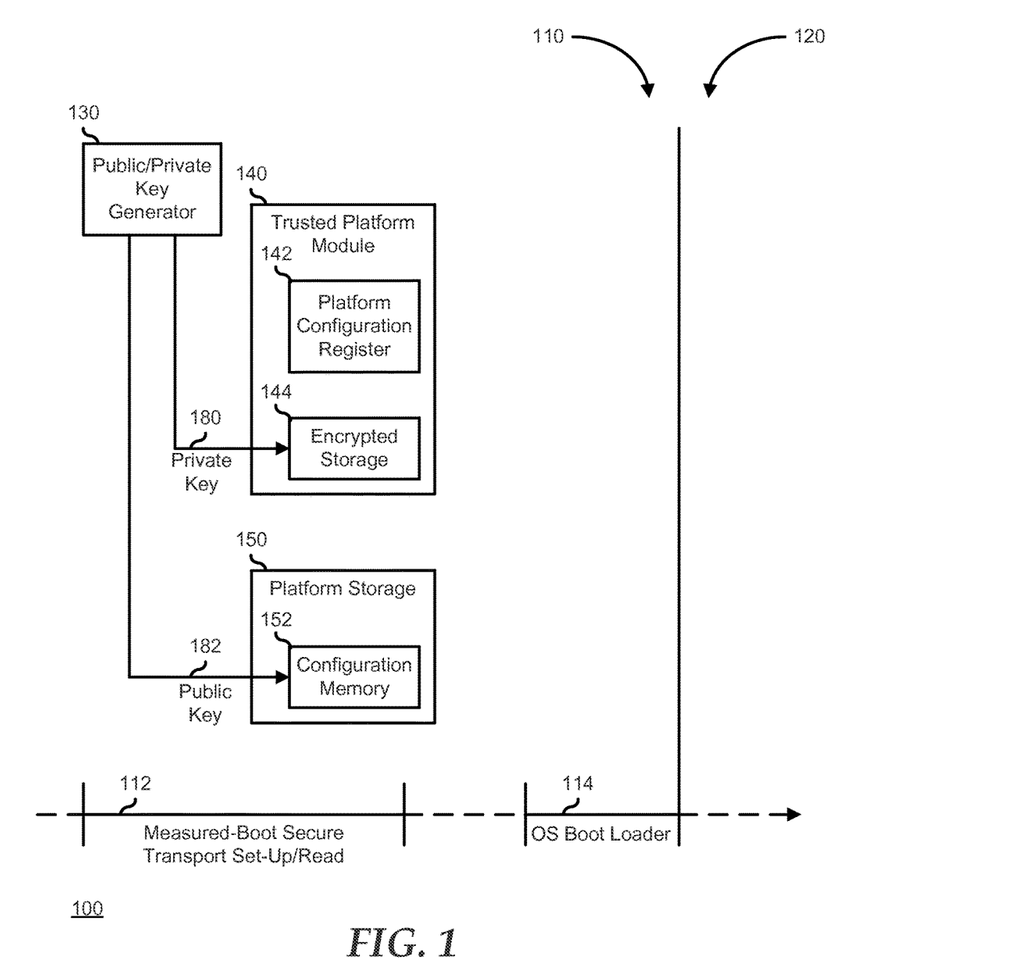
FIGS. 1 and 2 are partial block diagrams and partial flow diagrams illustrating a boot sequence for an information handling system according to an embodiment of the present disclosure.

FIG. 1 illustrates a boot sequence 100 for an information handling system that includes a public/private key generator 130, a trusted platform module (TPM) 140, and a platform storage device 150. Boot sequence 100 includes a pre-boot sequence 110 and an operating system (OS) sequence 120. Pre-boot sequence 110 implements a pre-boot authentication whereby measurement information for each component of the information handling system is gathered and stored in TPM 140. For example, one or more of a checksum, a hash, or another measurement of the contents can be determined for various software, firmware, and memory information in the information handling system. Then, a log of the measurement information can be made available to determine whether or not any of the components of the information handling system have been tampered with by malicious code, such as a virus, malware, spyware, or other threats to the security of the information handling system. An example of pre-boot authentication includes a measured boot, a power-on authentication, a run-time authentication, another pre-boot authentication implementation, or a combination thereof.

TPM 140 includes a platform configuration register (PCR) 142, and an encrypted storage 144. In a particular embodiment, TPM 140 includes one or more additional PCRs similar to PCR 142. TPM 140 operates to deterministically track an operating state of the TPM. Here, when the information handling system is powered on, TPM 140 is initialized in a first state where a particular PCR is the only one of the PCRs that is available to be written to or read from. Then, when TPM 140 enters a next state, a next PCR is the only one of the PCRs that is available to be written to or read from, and so on. In addition, data that is written to encrypted storage 144 during a particular state can be sealed to the associated PCR such that the data is only available to be read from the encrypted storage during the TPM operating state associated with that PCR.

Platform storage 150 represents one or more resources of the information handling system that is utilized for storage of data and information that is used by the information handling system. An example of platform storage 150 includes a disk drive or solid state drive for long term data and information storage, a system non-volatile RAM (NVRAM) for storage of a basic input/output system (BIOS), a unified extensible firmware interface (UEFI), system or device firmware, system settings, and the like, another persistent memory of the information handling system, or a combination thereof. Platform storage 150 includes configuration memory 152. In a particular embodiment, configuration memory 152 represents a memory for data and information that remains persistent on the information handling system across power cycle events such as power-down/power-up cycles, hardware resets, and the like, or that is otherwise repopulated on each power cycle event. In particular, configuration memory 152 can include data structures and tables that are used by the system BIOS or UEFI to configure the information handling system. An example of a data structure or table that can be stored in configuration memory 152 includes an advanced configuration and power interface (ACPI) table, a system management BIOS (SMBIOS) table or entry, a UEFI variable, another data structure or table, or a combination thereof.

Pre-boot sequence 110 includes a measured-boot secure transport set-up and read phase 112 and a measured OS boot loader phase 114. During measured-boot secure transport set-up and read phase 112 public/private key generator 130 operates to create a set of asymmetric cryptographic keys, to store 180 a private key to encrypted storage 144 and seal the private key to PCR 142, and to store 182 a public key to configuration memory 152. After the private key is stored to encrypted storage 144 and the public key is stored to configuration memory 152, measured-boot secure transport set-up and read phase 112 is completed, and the state of TPM 140 is changed so that the private key is locked into the TPM until a next boot cycle when a next pre-boot sequence of the information handling system enters a next measured-boot secure transport set-up and read phase similar to measured-boot secure transport set-up and read phase 112, as described below. At some point after the execution of measured-boot secure transport set-up and read phase 112, the information handling system enters measured OS boot loader phase 114 and an OS is launched on the information handling system, signaling the end of pre-boot sequence 110 and the beginning of OS sequence 120.

Figure 2:
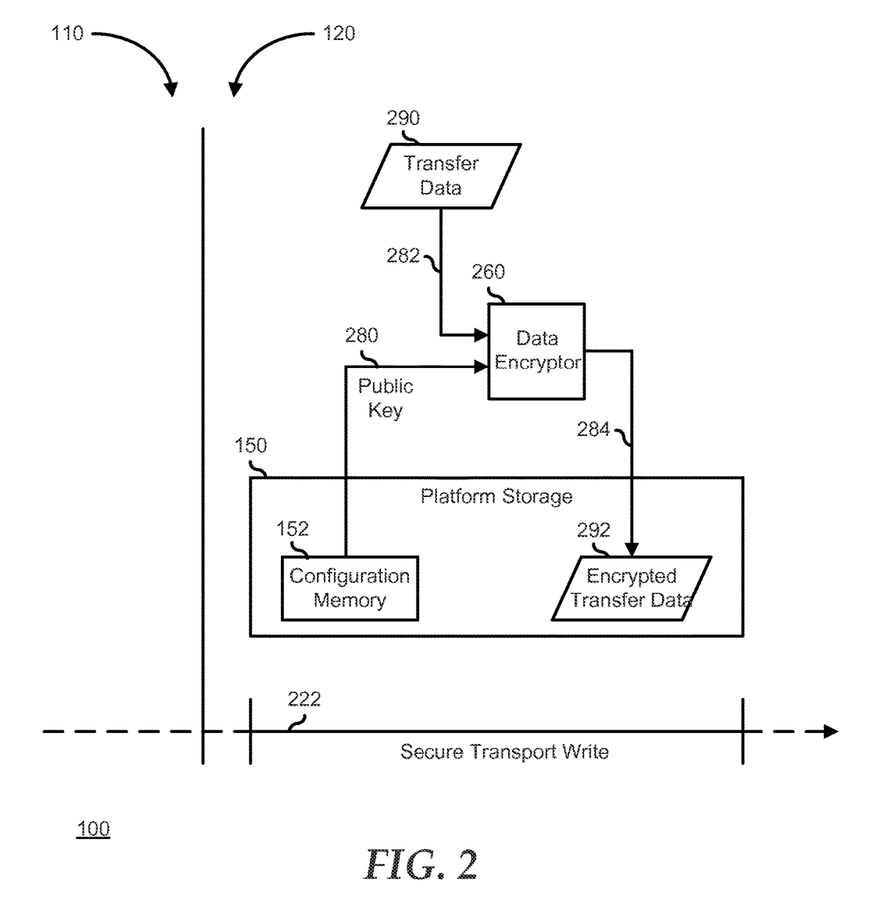

FIG. 2 illustrates the furtherance of boot sequence 100 for the information handling system into OS sequence 120. Here, the information handling system is shown as including a data encryptor 260. OS sequence 120 is show as continuing with a secure transport write phase 222. Here, data encryptor 260 retrieves 280 the public key from configuration memory 152, receives 282 transfer data 290, and encrypts the transfer data. Data encryptor 260 then stores 284 encrypted transfer data 292 on platform storage 292. Transfer data 290 represents data or information that is intended to be securely transported between the OS environment of the information handling system and the pre-boot environment. An example of transfer data 290 includes network proxy authentication information that can be used during a pre-boot sequence to access a secure network in order to perform MOS/UM or other firmware updates. Here, merely writing the network proxy authentication information to platform storage 150 would expose the network proxy authentication information to malicious code such as a virus, malware, botware, or other unauthorized access. However, because the network proxy authentication information is encrypted with a public key, and because the private key is locked in TPM 140, the network proxy authentication information is secure to be transported to the pre-boot environment, as shown below. The skilled artisan will recognize other examples where information from an OS environment is needed to be securely transported to a pre-boot environment.

Figure 3:
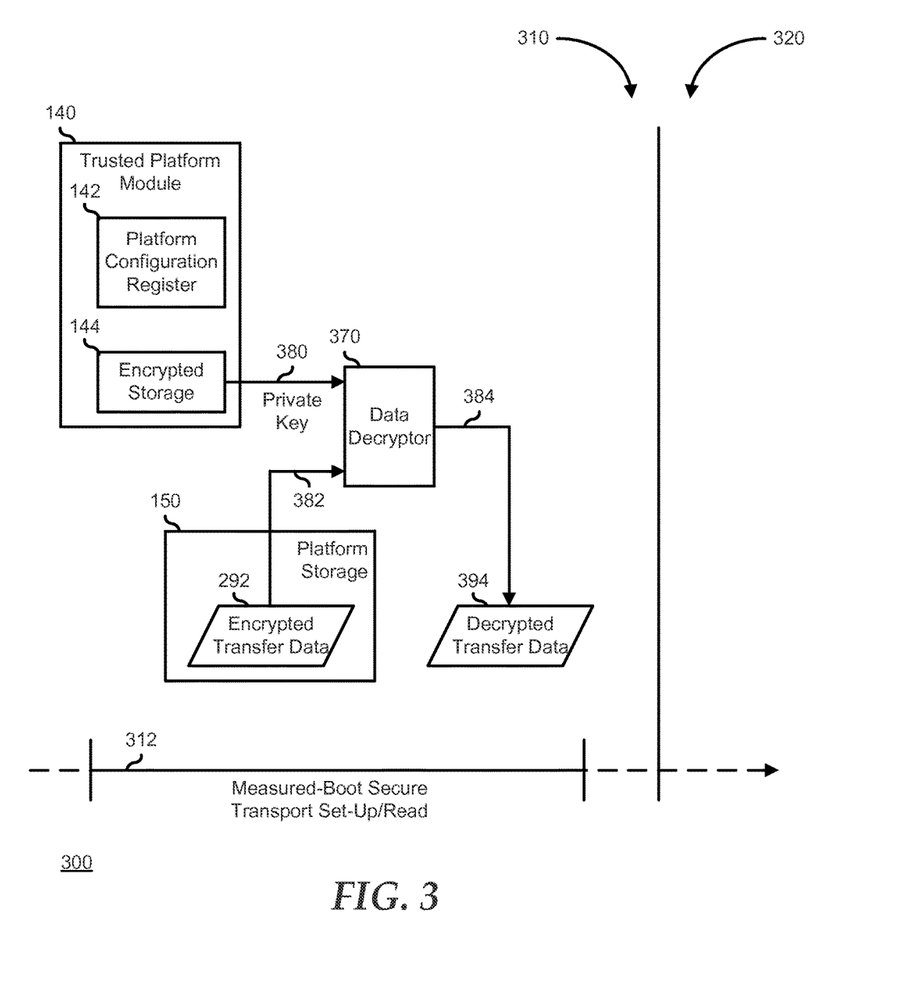
FIG. 3 is a partial block diagram and partial flow diagram illustrating a subsequent boot sequence for the information handling system of FIG. 1.

FIG. 3 illustrates a subsequent boot sequence 300 for the information handling system, and the information handling system is illustrated as including a data decryptor 370. In a particular embodiment, data decryptor 370 represents a common hardware encryption/decryption function of the information handling system. In another embodiment, data decryptor 370 represents a function call for that operates separately from data encryptor 260, such as where the data encryption performed by the data decryptor and the data decryption performed by the data decryptor are both performed by modules for carrying out a asymmetric cryptography scheme, such as a Diffie-Hellman key exchange protocol, a Digital Signature Standard (DSS), a Cramer-Shoup cryptosystem, or another asymmetric cryptography scheme, as needed or desired. Boot sequence 300 includes a pre-boot sequence 310 similar to pre-boot sequence 110, and an operating system (OS) sequence 320 similar to OS sequence 120.

Pre-boot sequence 310 includes a measured-boot secure transport set-up and read phase 312 similar to measured-boot secure transport set-up and read phase 112. As with measured-boot secure transport set-up and read phase 112, measured-boot secure transport set-up and read phase 312 is entered when TPM 140 is in a particular state during the boot-up of the information handling system. The particular state is characterized by the fact that PCR 142 is set to the value needed to unseal the encrypted data stored when TPM 140 is in the particular state. Here, when the information handling system enters measured-boot secure transport set-up and read phase 312, data decryptor 370 retrieves 380 the private key from encrypted storage 144, retrieves 382 encrypted transfer data 292 from platform storage 150 and decrypts 384 the encrypted transfer data with the private key to provide decrypted transfer data 394 to the BIOS/UEFI for use as needed or desired. Thus the secure transport of the transfer data from OS sequence 120 to pre-boot sequence 310 is completed.

Note that OS phase 120 does not have to be a part of the same power cycle as pre-boot phase 110. Here, during each boot of the information handling system, it is not necessarily to generate a new public/private key pair and store the keys as described above. Instead, the private key can be maintained in TPM 140 and sealed to PCR 142 and the public key can be maintained in configuration memory 152 through each subsequent pre-boot phase, and encrypted transfer data 292 can be generated during any particular OS phase as needed or desired. Moreover, any particular secure transport write phase similar to secure transport write phase 222 can generate multiple items of encrypted transfer data, as needed or desired. Also note that during any particular pre-boot phase, there may be no encrypted transfer data to be decrypted, or that the encrypted transfer data can be maintained in platform storage 150 such that the transfer data is decrypted on each subsequent pre-boot phase, as needed or desired.

In a particular embodiment, a pre-boot sequence includes multiple measured-boot secure transport set-up and read phases. During each measured-boot secure transport set-up and read phase, TPM 140 provides unique access to a different PCR. Also, during each measured-boot secure transport set-up and read phase, public/private key generator 130 operates to generate a different public/private key pair, locks the associated private key in TPM 140 sealed to the PCR, and stores the associated public key in a different location within configuration memory. Here, a different secure transport write phase can be associated with each public key, so that multiple encrypted transfer data is provided to the subsequent pre-boot phases.

Figure 4:
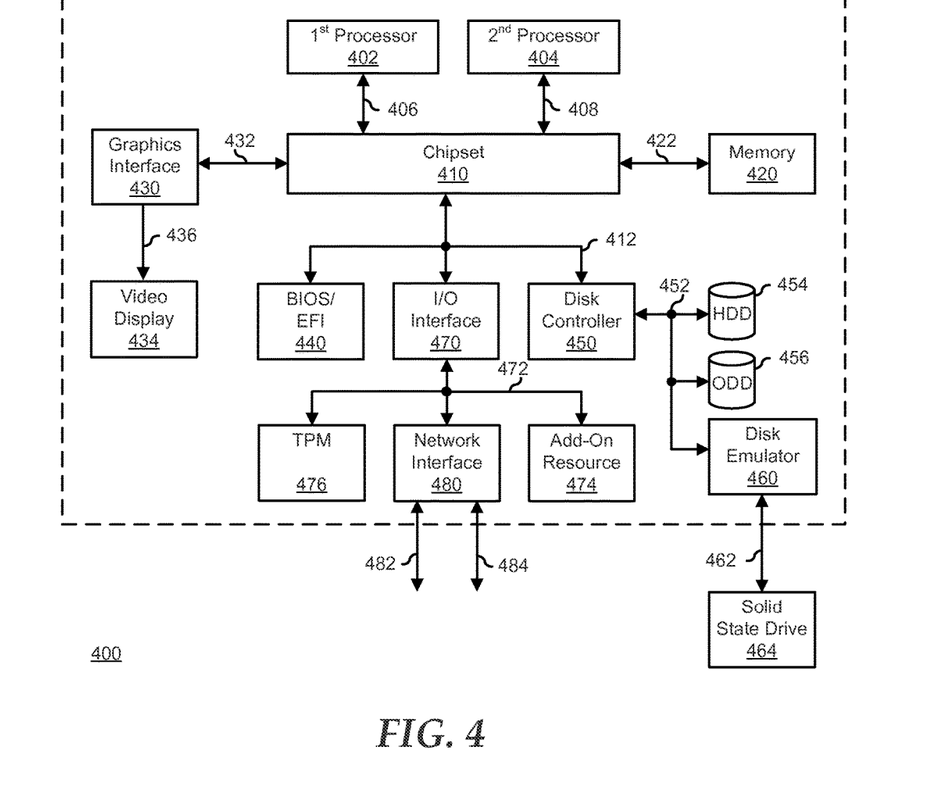
FIG. 4 is a block diagram illustrating a generalized information handling system according to an embodiment of the present disclosure.

FIG. 4 illustrates a generalized embodiment of information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), no embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described above, and operates to perform one or more of the methods described above. Information handling system 400 includes a processors 402 and 404, a chipset 410, a memory 420, a graphics interface 430, include a basic input and output system/extensible firmware interface (BIOS/EFI) module 440, a disk controller 450, a disk emulator 460, an input/output (I/O) interface 470, and a network interface 480. Processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial interface (SCSI) interface, an Inter-Integrated Circuit (I²C) interface, a System Packet Interface (SPI), a Universal Serial Bus (USB), another interface, or a combination thereof 1310S/EFI module 440 includes BIOS/EFI code operable to detect resources within information handling system 400, to provide drivers for the resources, initialize the resources, and access the resources. BIOS/EFI module 440 includes code that operates to detect resources within information handling system 400, to provide drivers for the resources, to initialize the resources, and to access the resources.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits a solid-state drive 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474, to a TPM 476, and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC, disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a key generator;
   a trusted platform module (TPM) operable to provide boot authentication for the information handling system, such that, during a first pre-boot phase, the TPM is operable to provide access to a first platform configuration register (PCR) of the TPM; and
   a storage device;
   wherein, during a first in time instance of the first pre-boot phase, the information handling system is operable to:
      direct the key generator to provide a first public/private key pair including a first public key and a first private key;
      store the first private key to an encrypted storage of the TPM, wherein the TPM is operable to provide boot authentication for the information handling system, such that, during the first pre-boot phase, the TPM is operable to provide access to the first PCR;
      seal the first private key to the first PCR in the first pre-boot phase; and
      store the first public key to the storage device; and
   wherein, during an operating system (OS) phase that is after the first in time instance of the first pre-boot phase, the information handling system is further operable to:
      retrieve the first public key from the storage device;
      encrypt first transfer data using the first public key, wherein the first transfer data is to be securely transported between the OS phase and the first pre-boot phase, wherein the first transfer data including an Advanced Configuration and Power interface (ACPI) table for the information handling system; and
      store the encrypted first transfer data to the storage device.

2. The information handling system of claim 1, wherein further, during a second in time instance of the first pre-boot phase that is after the OS phase, the information handling system is further operable to:
   retrieve the first private key sealed to the first PCR from the encrypted storage;
   retrieve the encrypted first transfer data from the storage device; and
   decrypt the encrypted first transfer data using the first private key.

3. The information handling system of claim 2, wherein, during the OS phase, the information handling system is further operable to:
   encrypt second transfer data using the first public key, wherein the second transfer data is to be securely transported between the OS phase and the first pre-boot phase; and
   store the encrypted second transfer data to the storage device.

4. The information handling system of claim 3, wherein further, during the second in time instance of the first pre-boot phase, the information handling system is further operable to:
   retrieve the encrypted second transfer data from the storage device; and
   decrypt the encrypted second transfer data using the first private key.

5. The information handling system of claim 1, wherein:
   during a second pre-boot phase, the TPM is operable to provide access to a second PCR of the TPM;
   during a first in time instance of the second pre-boot phase that is before the OS phase, the information handling system is further operable to:
      provide a second public/private key pair including a second public key and a second private key;
      store the second private key to the encrypted storage;
      seal the second private key to the second PCR in the second pre-boot phase; and
      store the second public key to the storage device; and
   during the OS phase, the information handling system is further operable to:
      retrieve the second public key from the storage device;
      encrypt second transfer data using the second public key, wherein the second transfer data is to be securely transported between the OS phase and the first pre-boot phase; and
      store the encrypted second transfer data to the storage device.

6. The information handling system of claim 5, wherein further, during a second in time instance of the second pre-boot phase that is after the OS phase, the information handling system is further operable to:
   retrieve the second private key sealed to the second PCR from the encrypted storage;
   retrieve the encrypted second transfer data from the storage device; and
   decrypt the encrypted second transfer data using the second private key.

7. The information handling system of claim 1, wherein the first transfer data comprises network proxy authentication information.

8. A method comprising:
   providing, by a key generator of an information handling system and during a first in time instance of a first pre-boot phase for the information handling system a first public/private key pair including a first public key and a first private key;

storing, during the first in time instance of the first pre-boot phase, the first private key to an encrypted storage of a trusted platform module (TPM) of the information handling system;

sealing the first private key to a first platform configuration register (PCR) of the TPM in the first pre-boot phase, wherein the TPM is operable to provide boot authentication for the information handling system, such that, during the first pre-boot phase, the TPM is operable to provide access to the first PCR;

storing, during the first in time instance of the first pre-boot phase, the first public key to a storage device of the information handling system;

retrieving, during an operating system (OS) phase that is after the first in time instance of the first pre-boot phase, the first public key from the storage device;

encrypting, during the OS phase, first transfer data using the first public key, wherein the first transfer data is to be securely transported between the OS phase and the first pre-boot phase, the first transfer data including an Advanced Configuration and Power Interface (ACPI) table for the information handling system; and storing, during the OS phase, the encrypted first transfer data to the storage device.

9. The method of claim 8, further comprising:

retrieving, during a second in time instance of the first pre-boot phase that is after the OS phase, the first private key sealed to the first PCR from the encrypted storage;

retrieving, during the second in time instance of the first pre-boot phase, the encrypted first transfer data from the storage device; and decrypting, during the second in time instance of the first pre-boot phase, the encrypted first transfer data using the first private key.

10. The method of claim 9, further comprising:

encrypting, during the OS phase, second transfer data using the first public key, wherein the second transfer data is to be securely transported between the OS phase and the first pre-boot phase; and storing, during the OS phase, the encrypted second transfer data to the storage device.

11. The method of claim 10, further comprising:

retrieving, during the second in time instance of the first pre-boot phase, the encrypted second transfer data from the storage device; and decrypting, during the second in time instance of the first pre-boot phase, the encrypted second transfer data using the first private key.

12. The method of claim 8, further comprising:

providing, by the information handling system and during a first in time instance of a second pre-boot phase for the information handling system that is before the OS phase, a second public/private key pair including a second public key and a second private key;

storing, during the first in time instance of the second pre-boot phase, the second private key to the encrypted storage;

sealing the second private key to a second PCR of the TPM in the second pre-boot phase, wherein the TPM is further operable to provide the boot authentication, such that, during the second pre-boot phase, the TPM is operable to provide access to the second PCR;

storing, during the first in time instance of the second pre-boot phase, the second public key to the storage device; and retrieving, during the OS phase, the second public key from the storage device;

encrypting, during the OS phase, second transfer data using the second public key, wherein the second transfer data is to be securely transported between the OS phase and the first pre-boot phase; and storing, during the OS phase, the encrypted second transfer data to the storage device.

13. The method of claim 12, further comprising:

retrieving, during a second in time instance of the second pre-boot phase that is after the OS phase, the second private key sealed to the second PCR from the encrypted storage;

retrieving, during the second in time instance of the second pre-boot phase, the encrypted second transfer data from the storage device; and decrypting, during the second in time instance of the first pre-boot phase, the encrypted second transfer data using the second private key.

14. The method of claim 8, wherein the first transfer date comprises network proxy authentication information.

15. A non-transitory computer-readable medium including code for performing a method, the method comprising:

providing, by a key generator of an information handling system and during a first in time instance of a first pre-boot phase for the information handling system a first public/private key pair including a first public key and a first private key;

storing, during the first in time instance of the first pre-boot phase, the first private key to an encrypted storage of a trusted platform module (TPM) of the information handling system;

sealing the first private key to a first platform configuration register (PCR) of the TPM in the first pre-boot phase, wherein the TPM is operable to provide boot authentication for the information handling system, such that, during the first pre-boot phase, the TPM is operable to provide access to the first PCR;

storing, during the first in time instance of the first pre-boot phase, the first public key to a storage device of the information handling system;

retrieving, during an operating system (OS) phase that is after the first in time instance of the first pre-boot phase, the first public key from the storage device;

encrypting, during the OS phase, first transfer data using the first public key, wherein the first transfer data is to be securely transported between the OS phase and the first pre-boot phase, the first transfer data including a System Management BIOS (SMBIOS) for the information handling system; and storing, during the OS phase, the encrypted first transfer data to the storage device.

16. The computer-readable medium of claim 15, the method further comprising:

retrieving, during a second in time instance of the first pre-boot phase that is after the OS phase, the first private key sealed to the first PCR from the encrypted storage;

retrieving, during the second in time instance of the first pre-boot phase, the encrypted first transfer data from the storage device; and decrypting, during the second in time instance of the first pre-boot phase, the encrypted first transfer data using the first private key.

17. The computer-readable medium of claim 16, the method further comprising:

encrypting, during the OS phase, second transfer data using the first public key, wherein the second transfer data is to be securely transported between the OS phase and the first pre-boot phase; and storing, during the OS phase, the encrypted second transfer data to the storage device.

18. The computer-readable medium of claim 17, the method further comprising:

retrieving, during the second in time instance of the first pre-boot phase, the encrypted second transfer data from the storage device; and decrypting, during the second in time instance of the first pre-boot phase, the encrypted second transfer data using the first private key.

19. The computer-readable medium of claim 15, the method further comprising:

providing, by the information handling system and during a first in time instance of a second pre-boot phase for the information handling system that is before the OS phase, a second public/private key pair including a second public key and a second private key;

storing, during the first in time instance of the second pre-boot phase, the second private key to the encrypted storage;

sealing the second private key to a second PCR of the TPM in the second pre-boot phase, wherein the TPM is further operable to provide the boot authentication, such that, during the second pre-boot phase, the TPM is operable to provide access to the second PCR;

storing, during the first in time instance of the second pre-boot phase, the second public key to the storage device; and retrieving, during the OS phase, the second public key from the storage device;

encrypting, during the OS phase, second transfer data using the second public key, wherein the second transfer data is to be securely transported between the OS phase and the first pre-boot phase; and storing, during the OS phase, the encrypted second transfer data to the storage device.

20. The computer-readable medium of claim 15, wherein the first transfer date comprises network proxy authentication information.

* * * * *